Nov. 13, 1923.
L. H. STROUD
1,474,300
ANCHOR FOR GREASE CUPS OR PLUGS
Filed April 17, 1922
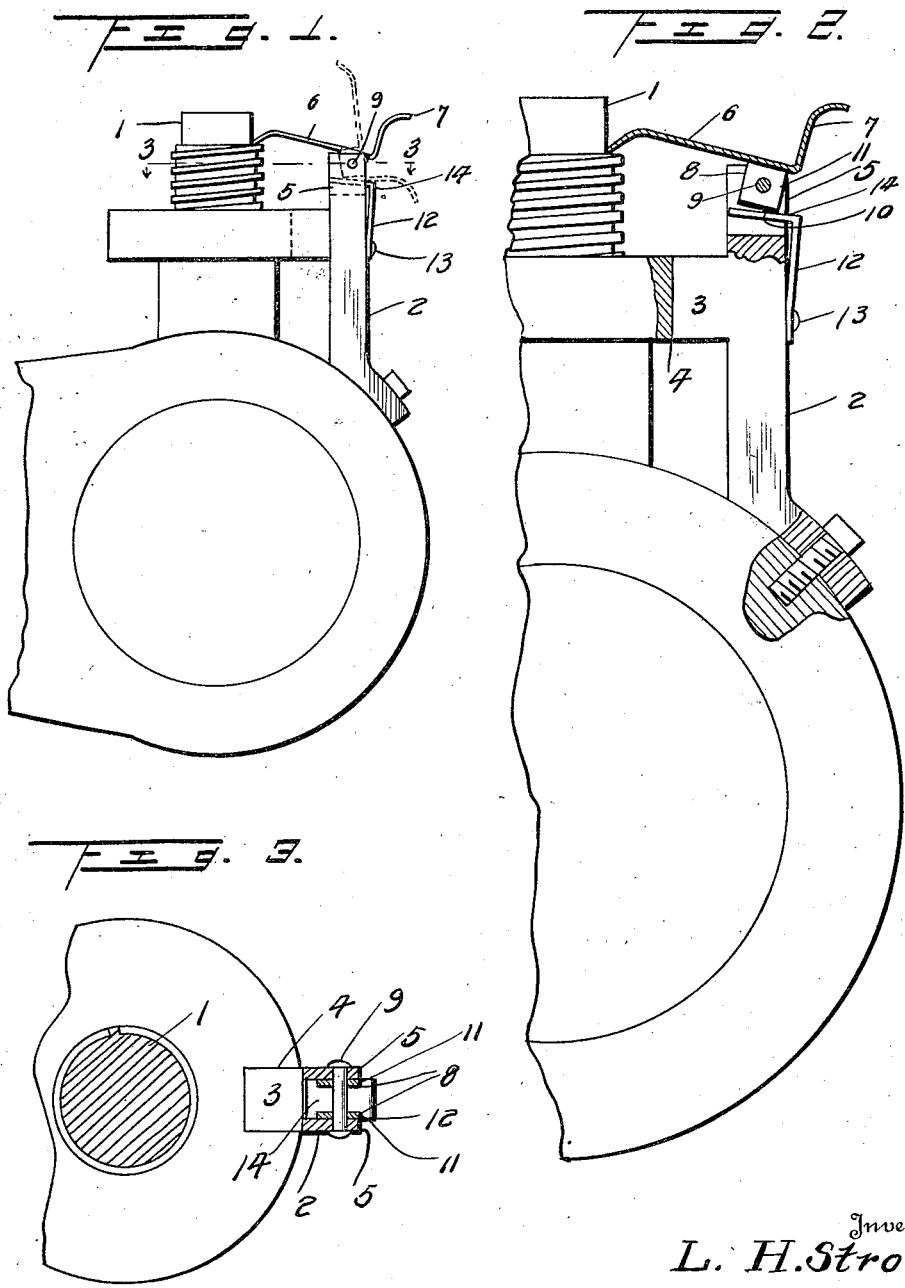
Inventor
L. H. Stroud Patented Nov. 13, 1923.

1,474,300

UNITED STATES PATENT OFFICE.

LAMONT H. STROUD, OF SHERIDAN, WYOMING.

ANCHOR FOR GREASE CUPS OR PLUGS.

Application filed April 17, 1922. Serial No. 554,335.

*To all whom it may concern:*

Be it known that I, LAMONT H. STROUD, a citizen of the United States, residing at Sheridan, in the county of Madison and State of Wyoming, have invented certain new and useful Improvements in Anchors for Grease Cups or Plugs; and I do hereby declare the following to be a full, clear, and exact description of the invention, such as will enable others skilled in the art to which it appertains to make and use the same.

This invention relates to new and useful improvements in anchors for grease plugs or cups mounted on moving parts of machinery and has for its primary object the provision of a device which will form a positive lock to prevent a plug or cup from backing out of its seat accidentally or due to vibration and which is adapted to permit the plug or cup to be moved, or filled, or actuated when desired.

Another object of this invention is the provision of an anchor for grease plugs or cups of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a side elevation, illustrating an anchor for grease plugs or caps and showing in dotted lines the lock positioned to free the plug or cup, Figure 2 is a vertical sectional view illustrating the same, Figure 3 is a sectional view taken on the line 3—3 of Figure 1.

Referring in detail to the drawing, the numeral 1 indicates a plug or grease cup secured to a bearing or bushing of a machine and which is subjected to movement. The grease plug or cup is usually threaded into the bushing and if not locked will become detached from the latter due to vibration and to provide a positive lock for prevention of the plug or cup becoming detached, I have provided an upright or post 2 secured to the bushing in any suitable manner and is provided with a lug 3 adjacent its upper end adapted to fit into a notch 4 of the cup or plug. The upper end of the post or upright is bifurcated to form spaced ears 5 between which a locking element 6 is pivoted and one end thereof extends beyond the lug 3 for an engagement with the plug or grease cup while its other end is bent angularly to form an actuating handle 7 whereby a person may readily engage and disengage the first named end of the element with the plug or cup. Spaced ears 8 are formed on the sides of the element and are provided with alined openings to receive the pivot bolt 9 which fastens the locking element to the ears of the uprights or posts. The ears 8 are provided with angularly related faces 10 and 11. A spring 12 is secured to the post or upright as shown at 13 and is bent as shown at 14 to extend between the ears 5 and engages the ears 8 to retain the locking element in its operative and inoperative position. The spring, when in engagement with the faces 10 of the ears 8, retains the locking element in engagement with the plug or cup and when in engagement with the faces 12, retains the locking element out of engagement with the plug or cup and in a position to permit the latter to be readily actuated or removed from its seat upon the bushing or other part of the machine. The cup engaging end of the locking element is flared or enlarged and bent angularly so that its end may catch firmly on the cup or plug and if desired may engage in a notch of said plug or cup.

While I have shown and described the preferred embodiment of my invention, it will be understood that minor changes in construction, combination and arrangement of parts may be made without departing from the spirit and scope of the invention as claimed.

Having thus described my invention what I claim is:

In combination with a bearing and a grease cup detachably secured thereto, an upright secured to the bearing, means carried by said upright and engaging the cup to hold the same against movement relative to the bearing, an element pivoted to said supporting member and adapted to be moved into and out of engagement with the cup closure, ears formed on said member and having angularly related faces, a flat spring secured to the supporting member and having a portion bent and adapted to be engaged by the respective angularly related faces of said ears, whereby to hold the locking element in operative or inoperative position.

In testimony whereof I affix my signature in presence of two witnesses.

LAMONT H. STROUD.

Witnesses:
C. R. ROEDEL,
OSCAR G. WAGNER.